(12) United States Patent
Juras et al.

(10) Patent No.: US 7,041,355 B2
(45) Date of Patent: May 9, 2006

(54) STRUCTURAL REINFORCEMENT PARTS FOR AUTOMOTIVE ASSEMBLY

(75) Inventors: Paul E. Juras, Royal Oak, MI (US); Kousay Said, Birmingham, MI (US); Gary Lawrey, Clarkston, MI (US); David G. McLeod, Rochester, MI (US)

(73) Assignee: Dow Global Technologies Inc., Midland, MI (US)

( * ) Notice: Subject to any disclaimer, the term of this patent is extended or adjusted under 35 U.S.C. 154(b) by 243 days.

(21) Appl. No.: 09/998,093

(22) Filed: Nov. 29, 2001

(65) Prior Publication Data

US 2003/0099826 A1 May 29, 2003

(51) Int. Cl.
  *B32B 3/00* (2006.01)
  *B32B 3/26* (2006.01)
  *B32B 7/12* (2006.01)
  *B32B 9/00* (2006.01)
  *B32B 15/04* (2006.01)

(52) U.S. Cl. ............... 428/71; 428/304.4; 428/317.1; 428/318.4; 428/318.8; 428/343; 428/354

(58) Field of Classification Search ............... 428/71, 428/304.4, 318.4, 318.8, 317.1, 343, 354
See application file for complete search history.

(56) References Cited

U.S. PATENT DOCUMENTS

| | | | |
|---|---|---|---|
| 2,866,744 A | 12/1958 | Askey et al. ............... 208/65 |
| 3,581,681 A * | 6/1971 | Netwon ....................... 108/51 |
| 3,755,212 A | 8/1973 | Dunlap et al. ......... 260/2.5 BD |
| 3,821,130 A | 6/1974 | Barron et al. ......... 260/2.5 BD |
| 3,849,146 A | 11/1974 | Walters et al. ............... 96/107 |
| 3,859,162 A * | 1/1975 | Johnson et al. .......... 428/318.6 |
| 4,017,117 A | 4/1977 | Eggert et al. ............ 296/146.6 |

(Continued)

FOREIGN PATENT DOCUMENTS

| | | |
|---|---|---|
| DE | 10163253 A1 | 12/2001 |
| EP | 0 827 473 B1 | 11/1996 |
| EP | 0 897 439 B1 | 11/1997 |
| EP | 0 899 300 A2 | 8/1998 |
| EP | 1 020 273 A1 | 7/2000 |

(Continued)

OTHER PUBLICATIONS

Derwent 2002–449608, JP 2002127938.
Derwent 2003–124835, JP2002362412.
Derwent 2000–340652, EP 999119A2.
U.S. Ser. No. 10/794,909, Michelle Boven et al., filed Mar. 5, 2004, Structural Reinforcement Article and Process for Preparation Thereof.
Patent Abstracts of Japan, JP 59077973.

*Primary Examiner*—Elizabeth M. Cole
*Assistant Examiner*—Victor S Chang

(57) ABSTRACT

The present invention is a structural reinforcement part for use in automobile assembly comprising a molded shell substantially filled with a structural filler material and an expandable adhesive in contact with the exterior of the molded shell; wherein the structural filler material does not undergo or require any chemical reaction or expansion, after part installation or during automotive assembly. This simplified structural reinforcement part does not require the in-situ foaming process of the prior art and produces a strong lightweight structural member which can be adhered to the automotive skeleton via the expandable adhesive upon exposure to heat during automotive assembly. This structural member offers easy installation, since no bulk systems, pumps or additional equipment is required.

7 Claims, 1 Drawing Sheet

U.S. PATENT DOCUMENTS

Figure 1:
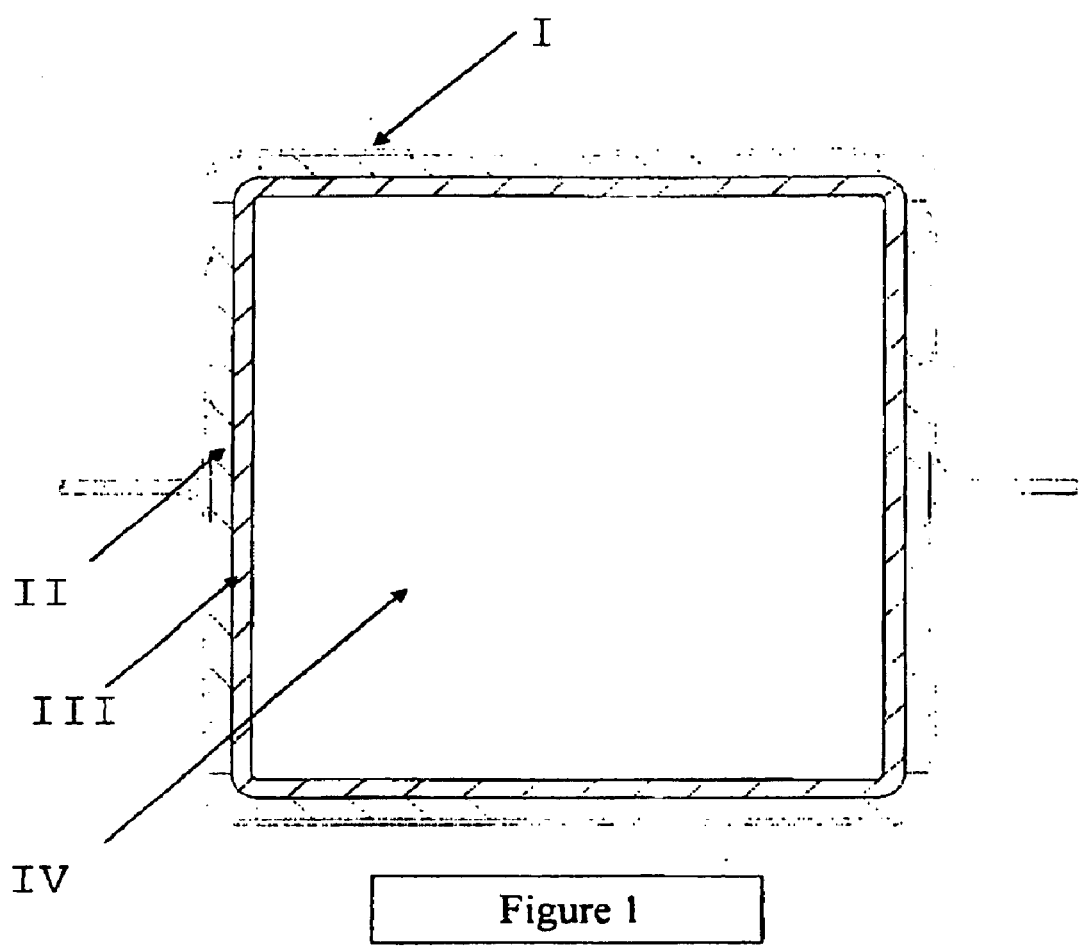

| | | | |
|---|---|---|---|
| 4,019,301 A | 4/1977 | Fox | |
| 4,390,645 A | 6/1983 | Hoffman et al. | 521/137 |
| 4,451,518 A | 5/1984 | Miura et al. | 296/146.6 |
| 4,751,249 A | 6/1988 | Wycech | 521/54 |
| 4,769,391 A | 9/1988 | Wycech | 521/54 |
| 4,813,690 A | 3/1989 | Coburn, Jr. | 277/205 |
| 4,874,650 A | 10/1989 | Kitoh et al. | |
| 4,898,630 A | 2/1990 | Kitoh et al. | |
| 4,997,951 A | 3/1991 | Bagga | 548/352 |
| 5,076,632 A | 12/1991 | Surratt | 296/205 |
| 5,102,188 A | 4/1992 | Yamane | 296/203.03 |
| 5,194,199 A | 3/1993 | Thum | |
| 5,213,391 A | 5/1993 | Takagi | 296/205 |
| 5,218,792 A | 6/1993 | Cooper | 296/203.03 |
| 5,266,133 A | 11/1993 | Hanley et al. | |
| 5,344,208 A | 9/1994 | Bien et al. | |
| 5,373,027 A | 12/1994 | Hanley et al. | |
| 5,506,025 A | 4/1996 | Otto et al. | |
| 5,533,781 A | 7/1996 | Williams | 296/204 |
| 5,545,361 A | 8/1996 | Rosasco | 264/45.2 |
| 5,575,526 A | 11/1996 | Wycech | |
| 5,609,385 A | 3/1997 | Daniel et al. | 296/203.01 |
| 5,648,401 A | 7/1997 | Czaplicki et al. | 521/85 |
| 5,660,428 A | 8/1997 | Catlin | 296/203.01 |
| 5,720,510 A | 2/1998 | Daniel et al. | 296/203.01 |
| 5,725,272 A | 3/1998 | Jones | |
| 5,755,486 A | 5/1998 | Wycech | |
| 5,806,919 A | 9/1998 | Davies | 296/205 |
| 5,857,734 A | 1/1999 | Okamura et al. | 296/187.12 |
| 5,866,052 A | 2/1999 | Muramatsu | 264/46.5 |
| 5,871,253 A | 2/1999 | Erber | 296/146.6 |
| 5,884,960 A | 3/1999 | Wycech | 296/146.6 |
| 5,888,600 A | 3/1999 | Wycech | 428/35.9 |
| 5,968,995 A | 10/1999 | Rizk et al. | 521/159 |
| 5,985,435 A | 11/1999 | Czaplicki et al. | 428/323 |
| 6,003,274 A | 12/1999 | Wycech | 52/232 |
| 6,040,350 A | 3/2000 | Fukui | 521/135 |
| 6,050,579 A | 4/2000 | Selland et al. | 296/204 |
| 6,058,673 A | 5/2000 | Wycech | |
| 6,062,624 A | 5/2000 | Crabtree et al. | |
| 6,068,424 A | 5/2000 | Wycech | 403/269 |
| 6,079,180 A | 6/2000 | Wycech | 296/203.01 |
| 6,092,862 A | 7/2000 | Kuwahara | 296/204 |
| 6,092,864 A | 7/2000 | Wycech et al. | 296/204 |
| 6,096,403 A | 8/2000 | Wycech | |
| 6,099,948 A | 8/2000 | Paver | 428/304.4 |
| 6,131,897 A | 10/2000 | Barz et al. | |
| 6,135,542 A | 10/2000 | Emmelmann et al. | 296/203.01 |
| 6,146,565 A | 11/2000 | Keller | |
| 6,146,566 A | 11/2000 | Beeck et al. | 264/101 |
| 6,149,227 A | 11/2000 | Wycech | 296/188 |
| 6,150,428 A | 11/2000 | Hanley, IV et al. | |
| 6,164,716 A | 12/2000 | Palazzolo et al. | 296/146.6 |
| 6,165,588 A | 12/2000 | Wycech | |
| 6,168,226 B1 | 1/2001 | Wycech | 296/146.6 |
| 6,189,953 B1 | 2/2001 | Wycech | 296/188 |
| 6,196,619 B1 | 3/2001 | Townsend et al. | 296/146.6 |
| 6,199,940 B1 | 3/2001 | Hopton et al. | |
| 6,218,442 B1 | 4/2001 | Hilborn et al. | 521/85 |
| 6,233,826 B1 | 5/2001 | Wycech | 29/897.1 |
| 6,237,304 B1 | 5/2001 | Wycech | 52/731.6 |
| 6,247,287 B1 | 6/2001 | Takabatake | 52/731.6 |
| 6,253,524 B1 | 7/2001 | Hopton et al. | |
| 6,270,600 B1 | 8/2001 | Wycech | 156/79 |
| 6,272,809 B1 | 8/2001 | Wycech | 52/731.6 |
| 6,276,105 B1 | 8/2001 | Wycech | 52/309.8 |
| 6,281,260 B1 | 8/2001 | Hanley, IV et al. | 521/135 |
| 6,286,896 B1 | 9/2001 | Eipper et al. | 296/189 |
| 6,287,666 B1 | 9/2001 | Wycech | 428/122 |
| 6,296,298 B1 | 10/2001 | Barz | 296/187 |
| 6,305,136 B1 | 10/2001 | Hopton et al. | 52/309.7 |
| 6,308,999 B1 | 10/2001 | Tan et al. | 293/109 |
| 6,311,452 B1 | 11/2001 | Barz et al. | 52/735.1 |
| 6,332,731 B1 | 12/2001 | Wycech | 403/171 |
| 6,346,573 B1 | 2/2002 | White | 525/121 |
| 6,348,513 B1 | 2/2002 | Hilborn et al. | 521/95 |
| 6,357,819 B1 | 3/2002 | Yoshino | 296/189 |
| 6,376,564 B1 | 4/2002 | Harrison | 521/54 |
| 6,378,933 B1 | 4/2002 | Schoen et al. | 296/203.02 |
| 6,387,470 B1 | 5/2002 | Chang et al. | 428/121 |
| 6,406,078 B1 | 6/2002 | Wycech | 293/120 |
| 6,413,611 B1 | 7/2002 | Roberts et al. | 428/99 |
| 6,419,305 B1 | 7/2002 | Larsen | 296/203.03 |
| 6,422,575 B1 | 7/2002 | Czaplicki et al. | 277/628 |
| 6,423,755 B1 | 7/2002 | Allen et al. | 521/111 |
| 6,451,231 B1 | 9/2002 | Harrison et al. | 264/45.3 |
| 6,455,126 B1 | 9/2002 | Wycech | 428/122 |
| 6,455,144 B1 | 9/2002 | Wycech | 428/308.4 |
| 6,467,834 B1 | 10/2002 | Barz et al. | 296/187 |
| 6,471,285 B1 | 10/2002 | Czaplicki et al. | 296/188 |
| 6,474,722 B1 | 11/2002 | Barz | 296/187 |
| 6,474,723 B1 | 11/2002 | Czaplicki et al. | 296/188 |
| 6,475,577 B1 | 11/2002 | Hopton et al. | 428/34.7 |
| 6,478,367 B1 | 11/2002 | Ishikawa | 296/203.03 |
| 6,482,486 B1 | 11/2002 | Czaplicki et al. | 428/36.91 |
| 6,494,525 B1 | 12/2002 | Blank | 296/187 |
| 6,502,821 B1 | 1/2003 | Schneider | 276/146.6 |
| 6,519,854 B1 | 2/2003 | Blank | 29/897.1 |
| 6,546,693 B1 | 4/2003 | Wycech | 52/790.1 |
| 6,550,847 B1 | 4/2003 | Honda et al. | 296/146.6 |
| 6,561,571 B1 | 5/2003 | Brennecke | 296/187 |
| 6,573,309 B1 | 6/2003 | Reitenbach et al. | 521/135 |
| 6,575,309 B1 | 6/2003 | Chiga | 210/435 |
| 6,607,238 B1 | 8/2003 | Barz | 296/187 |
| 6,619,727 B1 | 9/2003 | Barz et al. | 296/203.02 |
| 6,630,221 B1 | 10/2003 | Wong | 428/117 |
| 6,649,243 B1 | 11/2003 | Robert et al. | 428/99 |
| 6,668,457 B1 * | 12/2003 | Czaplicki | 29/897.1 |
| 6,739,641 B1 | 5/2004 | McLeod et al. | 296/37.2 |
| 2001/0040388 A1 | 11/2001 | Barz | 296/187 |
| 2002/0033617 A1 | 3/2002 | Blank | 296/187 |
| 2002/0036338 A1 | 3/2002 | Matsuo et al. | 257/686 |
| 2002/0053179 A1 | 5/2002 | Wycech | 52/721.4 |
| 2002/0074083 A1 | 6/2002 | Ludin et al. | 156/293 |
| 2002/0074827 A1 | 6/2002 | Fitzgerald et al. | 296/188 |
| 2002/0094427 A1 | 7/2002 | Edwards et al. | 428/297.4 |
| 2002/0096833 A1 | 7/2002 | Czaplicki et al. | 277/316 |
| 2002/0115736 A1 | 8/2002 | Koshy | 521/99 |
| 2002/0125739 A1 | 9/2002 | Czaplicki et al. | 296/187 |
| 2002/0148198 A1 | 10/2002 | Wycech | 52/790.1 |
| 2002/0160130 A1 | 10/2002 | Sheldon et al. | 428/34.1 |
| 2002/0164450 A1 | 11/2002 | Lupini et al. | 428/99 |
| 2002/0174954 A1 | 11/2002 | Busseuil et al. | 156/349 |
| 2002/0178584 A1 | 12/2002 | Wycech | 29/897.2 |
| 2002/0192387 A1 | 12/2002 | Agarwal et al. | 427/407.1 |
| 2003/0001410 A1 | 1/2003 | Cate et al. | 296/187 |
| 2003/0001469 A1 | 1/2003 | Hankins et al. | 312/257.1 |
| 2003/0018095 A1 | 1/2003 | Agarwal | 521/59 |
| 2003/0099826 A1 | 5/2003 | Juras et al. | 428/343 |
| 2003/0102686 A1 | 6/2003 | McLeod et al. | 296/37.2 |
| 2003/0102687 A1 | 6/2003 | McLeod et al. | 296/37.2 |
| 2003/0127844 A1 | 7/2003 | Gloceri et al. | 280/788 |
| 2003/0137162 A1 | 7/2003 | Kropfeld | 296/203.01 |
| 2003/0184121 A1 | 10/2003 | Czaplicki et al. | 296/187.02 |
| 2003/0209921 A1 | 11/2003 | Coon et al. | 296/187.02 |
| 2004/0131839 A1 | 7/2004 | Eagle | 428/317.1 |

FOREIGN PATENT DOCUMENTS

| | | |
|---|---|---|
| EP | 1 364 862 A2 | 4/2003 |
| WO | 99/08854 | 2/1999 |
| WO | 00/13876 | 3/2000 |

| | | | | | | |
|---|---|---|---|---|---|---|
| WO | | 00/27920 | 5/2000 | WO | WO 01/68394 A1 | 9/2001 |
| WO | | 00/55444 | 9/2000 | WO | 01/41950 A2 | 12/2001 |
| WO | | 01/34453 A1 | 5/2001 | WO | 02/12026 A1 | 3/2002 |
| WO | | 01/41950 A2 | 6/2001 | WO | 02/24451 A1 | 3/2002 |
| WO | | 01/41950 A3 | 6/2001 | WO | 02/26549 A1 | 4/2002 |
| WO | | 02/31077 A2 | 6/2001 | WO | 02/26550 A1 | 4/2002 |
| WO | | 01/54936 A1 | 8/2001 | WO | 02/31077 A3 | 4/2002 |
| WO | WO 01/55523 A1 | | 8/2001 | WO | 02/36338 A1 | 5/2002 |
| WO | WO 01/55523 | | 8/2001 | WO | 02/49836 A1 | 6/2002 |
| WO | | 01/56845 A1 | 8/2001 | WO | 02/074608 A1 | 9/2002 |
| WO | WO 01/58741 | | 8/2001 | WO | 02/074609 A1 | 9/2002 |
| WO | WO 01/58741 A1 | | 8/2001 | WO | 02/087843 A1 | 11/2002 |
| WO | WO 01/62394 | | 9/2001 | WO | 02/088214 | 11/2002 |
| WO | | 01/68342 A1 | 9/2001 | | | |

STRUCTURAL REINFORCEMENT PARTS FOR AUTOMOTIVE ASSEMBLY

The present invention relates to structural reinforcement parts which are useful in automotive applications.

BACKGROUND

Reducing automotive vehicle weight, while maintaining safety and structural performance requirements, is a key design challenge facing automotive engineers. Minimizing vehicle mass is also essential in meeting increasingly stringent fuel economy, CAFE (Corporate Average Fuel Economy), and emission requirements. Engineers must find new methods, processes, and technologies to minimize vehicle weight without sacrificing engineering design requirements.

Conventional methods to improve body structure performance include modifying sheet metal thicknesses, modifying structure cross-section dimensions, and adding additional reinforcements and sheet metal pieces.

U.S. Pat. No. 5,194,199 discloses a structural part, such as a beam for vehicle construction, formed of a hollow metal member and a prefabricated reinforcing core of light-weight material. The part is produced by providing the core with a shell of heat-foamable material, and subjecting the assembly to a heated immersion-coating operation to expand the heat-foamable material. However this process requires a foaming shell which allows for uncertainty in the shape and size of the shell.

WO 01/55523 discloses a reinforcing member for a structural component comprising a carrier and a thermally expansible structural reinforcing material element. The thermally expansible reinforcing material is a synthetic resin which foams during high temperature baking in the automobile manufacturing process, (e.g. paint and powder coat bake stage). However, these foaming in-place processes are not preferred, due to the difficulty in controlling the core foam expansion path and direction, and also in minimizing foam usage and weight within the core.

WO 01/58741 discloses a structural reinforcement system for automobiles comprising a skeletal member and an expandable material disposed thereon for bonding the reinforcement system to the automotive frame. WO 01/68394 discloses a heat activated reinforcing sleeve comprising a polymer carrier and a heat activated structural foam reinforcing medium, such as epoxy based resin. However, these systems require complex frames having multiple reinforcing ribs.

Therefore, there remains a continued need for high performing, lightweight, cost-effective, process-friendly structural reinforcement parts for use in automobile frame and body structure applications.

SUMMARY

The present invention is a structural reinforcement part for use in automobile applications, comprising:
1) a molded shell, having a set shape and size, comprising a polymer wall having an interior and an exterior face, wherein said interior face defines a space within the molded shell;
2) a structural filler material disposed in and substantially filling said space within the molded shell, and
3) a heat-activated expandable adhesive in contact with the exterior face of the polymer wall;
wherein the structural filler material does not undergo or require any chemical reaction or expansion, after part installation or during automotive assembly.

Specific features and characteristics of the material components listed above can be manipulated and modified in order to provide significant design flexibility such that each part can meets its specific application performance requirements for the minimum possible part weight. The molded shell can vary in material type, shape, thickness, and number of integrated design features. The structural filler material type and density can also be varied to provide the optimum performance levels. The combined behavior of all the material comprised in the part results in superior structural performance with respect to strength, stiffness, and energy absorption characteristics.

The part components specified can be manifested into several different part embodiments. A thick-walled shell can be surrounded by lighter density foam such that the majority of the part strength is provided by the surrounding shell vessel. Another embodiment involves a thinner, semi-structural shell filled with higher density structural filler material, such that structural demands are shared by both materials. Another embodiment uses a thin-walled molded shell which functions primarily as a carrier and transfer agent for high strength and energy absorbing core filler material. Various part embodiments can also perform dual purpose as an acoustic sealer as well as a structural reinforcement.

This simplified structural reinforcement part does not require in-situ foaming of the structural filler material as in the prior art and produces a strong lightweight structural member which can be adhered to the automotive frame via the expandable adhesive, upon exposure to heat during the automotive assembly process. This structural reinforcement part offers ease of installation, since no bulk systems, pumps, or additional equipment is required.

DETAILED DESCRIPTION OF THE DRAWING

FIG. 1 is a cross-sectional view of a structural reinforcement part, wherein I is the surrounding structure of the automobile frame, II is the expandable adhesive, III is the molded shell and IV is the structural filler material.

DETAILED DESCRIPTION

The structural reinforcement part of the present invention comprises a molded shell, having a set shape and size, wherein the shell comprises a polymer wall having an interior and an exterior face, and a space defined by said interior face. The molded shell can be produced from any high temperature resistant performance plastic which can withstand process environment conditions and automotive assembly plant oven temperatures without showing significant degradation in performance. That is, the molded shell will retain its' size and shape at such temperatures experienced in the automotive assembly process without any detrimental deformation. Typical plastic materials include, but are not limited to, semi-crystalline or amorphous materials including, polyamides such as nylon 6, nylon 6/6, nylon 6/6/6, polyolefins such as polyethylene or polypropylene, syndiotactic vinyl aromatic polymers such as syndiotactic polystyrene (SPS) and any blends thereof. Other potential polymers include polyesters, polyesteramides, polyarylates, polyurethanes, polyureas, polyphenylene sulfides, and polyetherimides.

The molded shell can be produced by any molding technique which will produce a shell having a set shape and size, a polymer wall having an interior and exterior face, and a space defined by the interior polymer wall face, or inner boundary of the shell. Typical molding techniques include, but are not limited to, well known processes such as blow molding, injection molding, rotational molding, pressure forming and the like.

The molded shell can vary in shape, size, and thickness depending on the desired cavity size and application requirements in order to balance strength, dimensional stability, and mass objectives. Preferably the molded shell is a rectangular or square shape, having a single space defined by the interior face of the shell for which to be filled with acceptable structural expandable material. Molded shell geometry can also integrate other design features such as ribs, local contours, or tack-offs in order to optimize functional part performance. Typically, the polymer wall will be a thickness so as to conserve material and reduce weight. The wall thickness will typically vary from 1.5 mm to 10 mm, depending upon the materials used and the specific application requirements.

The structural filler material can be any material which can be used to offer structural reinforcement to the molded shell. The material can be selected depending upon the properties required in the specific application.

Typically, the molded shell encases a foam structural filler material which is expanded and cured prior to part installation. The foam material is disposed in and fills the space defined within the inner face of the polymer wall. In other words the foam material is in substantial continuous contact with the inner face of the polymer wall. The foam material will typically have a density from about 5 pounds per cubic feet (80 $Kg/m^3$) to about 25 pounds per cubic feet (400 $Kg/m^3$) once fully expanded. The foam filler material will be injected, expanded and fully cured in the molded shell prior to installation into an automotive body cavity.

In one embodiment, the structural filler material is a polyurethane thermoset polymer foam. However, other structural filler material types can also be used such as other thermoset and thermoplastic fillers including epoxies, polyurethane hybrids, polyolefins, syndiotactics, composites, and other rigid foams. Non-plastic filler materials such as aluminum foam, organic and non-organic (ceramic and metallic) foams can also used.

Any method of introduction into the molded shell can be used for placement of the structural filler material. Typically, filler material is placed or injected and fully-reacted within the molded shell cavity prior to insertion in the automotive body structure cavity. A pump unit, or other appropriate injection technique, can be used to inject filler material into the molded shell.

Structural filler material is typically injected into the molded shell prior to the part placement in an automotive assembly process. The molded shell will have some means of introduction, such as an insertion hole, for the structural filler material. This means can be any embodiment so as to allow for the injection or insertion of structural filler material or components thereof. Typically, components will comprise a polymer or monomers and blowing agent. In some cases the material is produced from the combination of "A-side" and "B-side" components which cure under ambient conditions. For example, the A-side may consist of isocyanate prepolymer or polymeric methylene diphenyl isocyanate (MDI) and the B-side may consist of a polyol blend nominally consisting of various polyols, surfactants, catalysts, and water. The filler material can also contain fillers such as glass beads, thixotropic additives, and other composite fibers. Blowing agents include any blowing agent which can be used with the material selected for the structural filler material and can be either chemical, physical blowing agents or combinations thereof. The blowing agents can be combined with the polymer in a pre-mixed state and injected into the molded shell or may be added simultaneously with the polymer or polymer components. Single component foam materials and systems can also be used, such as those described in U.S. Pat. Nos. 4,923,902 and 4,995,545, incorporated herein by reference.

In addition to the molded shell and structural filler material, the structural reinforcement part also comprises an expandable adhesive in contact with the outer face of the molded shell. The expandable adhesive can be any organic material which will activate at temperatures experienced in relevant automotive body treatment processes such as e-coat, paint, or sealer ovens, i.e. 110° C. or higher, to expand and adhere to the surrounding structure. A typical expandable adhesive includes a polymeric base material, such as an epoxy resin or ethylene-based polymer which, when compounded with appropriate ingredients (typically a blowing and curing agent), expands and cures in a reliable and predictable manner upon the application of heat. The expandable adhesive will also crosslink upon curing or achieve it's final shape, rendering the material incapable of further flow or shape change. Any material that is heat-activated and expands and cures in a predictable and reliable manner under appropriate conditions, while meeting structural requirements, for the selected application can be used. Other useful materials include polyolefins, copolymers and terpolymers with at least one monomer type an alpha-olefin, phenol/formaldehyde materials, phenoxy materials, and polyurethane materials with high glass transition temperature such as in U.S. Pat. Nos. 5,766,719; 5,755,486, 5,575, 526; 5,932,680 incorporated by reference.

Flowable expandable adhesive can be applied to the outer face of the shell wall in any manner, including dipping, laminating, brushing, rolling, co-extruding, and the like. Additionally, the expandable adhesive can be preformed or die-cut into pieces, which can be placed or adhered to the outer face of the shell wall. In one embodiment, the expandable adhesive is substantially continuous throughout the periphery of the outer face.

Once the reinforcement structural part is produced, the structural part can be placed in the desired cavity during automotive product assembly. Upon exposure to temperatures of 110° C. or above, the expandable adhesive on the exterior of the shell will foam and additionally adhere to the application frame, while the structural foam material will not further react or expand under such conditions. It is possible that the structural part may require some type of temporary mechanical fastener or adhesive to hold in place until the adhesive is activated. Additionally, the adhesive will expand to fill the gaps that exists between the exterior expandable material and the surrounding frame or structure.

The present invention allows for maximum flexibility with design of a structural reinforcement part due to the freedom in selection of material for both the molded shell and structural filler material. It is light in weight, and the strength of the part material can be optimized by increasing or decreasing the foam density, shell thickness, shell material type, shell design features, or overall shell geometry.

In one embodiment, the molded shell is produced from a composition comprising a nylon polymer, the structural filler is a polyurethane foam, and the expandable adhesive is an heat-activated expandable foam.

Another aspect of the present invention is a method for producing a structural reinforcement part for automotive assembly comprising:

1) forming a molded shell, having a set shape and size, comprising a polymer wall having an interior and an exterior face, wherein said interior face defines a cavity within the molded shell;
2) injecting into said cavity a structural filler material or components thereof such that the cavity is substantially filled, and
3) contacting an expandable adhesive with the exterior face of the polymeric wall;

wherein the structural filler material does not undergo or require any chemical reaction or expansion, after part installation or during automotive assembly.

What is claimed is:

1. A structural reinforcement part for use in automobile applications comprising:
   1) a molded shell, having a set shape and size, comprising a polymer wall having an interior and an exterior face, wherein said interior face defines a space within the molded shell;
   2) a structural filler material disposed in and substantially filling said space within the molded shell, and
   3) a heat-activated expandable adhesive in contact with the exterior face of the polymier wall, wherein the structural filler material does not undergo or require any chemical reaction or expansion, after part installation or during automotive assembly.

2. The structural reinforcement part of claim 1, wherein the molded shell is produced from a polymer selected from polyamides, polyolefins, syndiotactic vinyl aromatic polymers, and blends thereof.

3. The structural reinforcement part of claim 2, wherein the molded shell is produced from a polyamide.

4. The structural reinforcement part of claim 1, wherein the structural filler material is selected from polyurethane and aluminum foams.

5. The structural reinforcement part of claim 4, wherein the structural filler material is polyurethane foam.

6. The structural reinforcement part of claim 1, wherein the expandable adhesive is selected from expandable epoxies, polyolefins and thermoplastic polyurethanes.

7. A part according to claim 6 wherein the structural filler material has a density of about 5 to about 25 pounds per cubic foot.

* * * * *